(12) United States Patent
Beilis et al.

(10) Patent No.: US 10,582,055 B2
(45) Date of Patent: Mar. 3, 2020

(54) SYSTEM AND METHOD FOR MANAGING CONTACT CENTER SYSTEM

(71) Applicant: Genesys Telecommunications Laboratories, Inc., Daly City, CA (US)

(72) Inventors: David Beilis, Toronto (CA); Vasiliy Malakhov, Toronto (CA); Arnaud Lejeune, Chicago, IL (US)

(*) Notice: Subject to any disclaimer, the term of this patent is extended or adjusted under 35 U.S.C. 154(b) by 130 days.

(21) Appl. No.: 15/635,168

(22) Filed: Jun. 27, 2017

(65) Prior Publication Data

US 2018/0375998 A1  Dec. 27, 2018

(51) Int. Cl.
| | |
|---|---|
| *H04M 3/00* | (2006.01) |
| *H04M 3/51* | (2006.01) |
| *H04L 29/08* | (2006.01) |
| *H04L 12/58* | (2006.01) |
| *H04M 3/42* | (2006.01) |

(52) U.S. Cl.
CPC .......... *H04M 3/5175* (2013.01); *H04L 51/02* (2013.01); *H04L 51/043* (2013.01); *H04L 51/14* (2013.01); *H04L 67/22* (2013.01); *H04M 3/5191* (2013.01); *H04M 3/42382* (2013.01); *H04M 2203/401* (2013.01); *H04M 2203/404* (2013.01)

(58) Field of Classification Search
CPC .......................... H04M 3/5175; H04L 51/043
USPC ....... 379/265.01–265.14, 266.01–266.1, 309
See application file for complete search history.

(56) References Cited

U.S. PATENT DOCUMENTS

| | | | | |
|---|---|---|---|---|
| 7,711,104 | B1 * | 5/2010 | Flockhart | H04M 3/5191 379/265.03 |
| 8,873,720 | B1 * | 10/2014 | Ouimette | H04M 3/42221 379/266.1 |
| 8,948,369 | B2 | 2/2015 | Shaffer et al. | |
| 9,043,407 | B1 * | 5/2015 | Gaulke | H04L 51/046 709/206 |
| 10,176,808 | B1 * | 1/2019 | Lovitt | G06F 16/635 |
| 2005/0235034 | A1 * | 10/2005 | Chen | H04L 12/1831 709/206 |
| 2008/0152122 | A1 * | 6/2008 | Idan | H04M 3/5175 379/265.07 |
| 2011/0295654 | A1 * | 12/2011 | Waldron, III | G06Q 10/06 705/7.38 |
| 2015/0098561 | A1 * | 4/2015 | Etison | H04M 3/5175 379/265.06 |
| 2015/0195406 | A1 * | 7/2015 | Dwyer | H04M 3/5175 379/265.07 |
| 2016/0026962 | A1 * | 1/2016 | Shankar | G06Q 10/06398 705/7.42 |
| 2016/0212265 | A1 | 7/2016 | Philonenko et al. | |
| 2016/0381221 | A1 * | 12/2016 | Yoakum | H04M 3/5175 379/265.06 |

(Continued)

*Primary Examiner* — William J Deane, Jr.

(57) ABSTRACT

In a method for managing a contact center system, the method includes: retrieving, by a processor, performance metric data for a plurality of performance metrics of the contact center system; initiating, by the processor, a text-based chat communication with a first electronic device operated by a first agent; displaying, by the processor, an alert during the text-based chat communication, the alert being indicative that a first performance metric from among the plurality of performance metrics is outside a predetermined range of values; and displaying, by the processor, the first performance metric in a chat interface of the text-based chat communication.

20 Claims, 10 Drawing Sheets

(56) References Cited

U.S. PATENT DOCUMENTS

2018/0077101 A1* 3/2018 Desouza Sana ........ H04L 51/18
2018/0083792 A1* 3/2018 Wanderski ........ G06F 17/30997
2019/0196421 A1* 6/2019 Littlefield .......... G06Q 10/0639

* cited by examiner

SYSTEM AND METHOD FOR MANAGING CONTACT CENTER SYSTEM

FIELD

Aspects of embodiments of the present invention relate to a system and method for managing a contact center system.

BACKGROUND

In order to remain competitive in the modern commerce system, many businesses remain constantly vigilant of evolving consumer demands, and strive to provide customers with the high quality products and services that they desire. To that end, many businesses employ contact centers that include automated systems and representatives of the business to process transactions and/or service the needs of their customers.

Such contact centers may utilize a number of communication channels to engage with customers, such as telephone, email, live web chat, and the like. For example, in many instances, an end user or customer may be routed to a live human agent to assist the end user with his or her needs.

In addition to providing customers with high quality customer service, businesses operating a contact center also desire to maintain efficiency of operations. For example, managers in charge of monitoring and managing the operations of a contact center may desire to have quick and convenient access to various metrics and data relevant to the ongoing contact center operations in real time.

The above information discussed in this Background section is only for enhancement of understanding of the background of the described technology and therefore it may contain information that does not constitute prior art that is already known to a person having ordinary skill in the art.

SUMMARY

Embodiments of the present invention are directed to systems and methods for managing chat automation.

According to some embodiments of the present invention, in a method for managing a contact center system, the method includes: retrieving, by a processor, performance metric data for a plurality of performance metrics of the contact center system; initiating, by the processor, a text-based chat communication with a first electronic device operated by a first agent; displaying, by the processor, an alert during the text-based chat communication, the alert being indicative that a first performance metric from among the plurality of performance metrics is outside a predetermined range of values; and displaying, by the processor, the first performance metric in a chat interface of the text-based chat communication.

According to some embodiments, the method further includes transmitting, by the processor, a plurality of prompts for retrieving additional performance metric data from the plurality of performance metrics.

According to some embodiments, the method further includes monitoring, by the processor, the first performance metric data; and detecting, by the processor, the first performance metric is outside the predetermined range of values for triggering the alert.

According to some embodiments, the method further includes detecting, by the processor, an input from the first electronic device requesting display of the performance metric.

According to some embodiments, the method further includes displaying, by the processor, the alert during the text-based chat communication in response to the first performance metric having a value above a predetermined threshold value.

According to some embodiments, the method further includes displaying, by the processor, the alert during the text-based chat communication in response to the first performance metric having a value below a predetermined threshold value.

According to some embodiments, the method further includes monitoring, by the processor, input from an agent device during the text-based chat communication.

According to some embodiments, the method further includes, in response to detecting the input is indicative of a request to data corresponding to a second performance metric, displaying, by the processor, the second performance metric data in the chat interface of the text-based chat communication.

According to some example embodiments of the present invention, in a system for managing a contact center system, the system includes: a processor; and a memory coupled to the processor, wherein the memory stores instructions that, when executed by the processor, cause the processor to: retrieve performance metric data for a plurality of performance metrics of the contact center system; initiate a text-based chat communication with a first electronic device operated by a first agent; display an alert during the text-based chat communication, the alert being indicative that a first performance metric from among the plurality of performance metrics is outside a predetermined range of values; and display the first performance metric in a chat interface of the text-based chat communication.

According to some embodiments, the instructions further cause the processor to transmit a plurality of prompts for retrieving additional performance metric data from the plurality of performance metrics.

According to some embodiments, the instructions further cause the processor to: monitor the first performance metric data; and detect the first performance metric is outside the predetermined range of values for triggering the alert.

According to some embodiments, the instructions further cause the processor to detect an input from the first electronic device requesting display of the performance metric.

According to some embodiments, the instructions further cause the processor to display the alert during the text-based chat communication in response to the first performance metric having a value above a predetermined threshold value.

According to some embodiments, the instructions further cause the processor to display the alert during the text-based chat communication in response to the first performance metric having a value below a predetermined threshold value.

According to some embodiments, the instructions further cause the processor to monitor input from an agent device during the text-based chat communication.

According to some embodiments, the instructions further cause the processor to, in response to detecting the input is indicative of a request to data corresponding to a second performance metric, display the second performance metric data in the chat interface of the text-based chat communication.

According to some example embodiments of the present invention, in a system for managing a contact center system, the system includes: means for retrieving performance metric data for a plurality of performance metrics of the contact center system; means for initiating a text-based chat communication with a first electronic device operated by a first agent; means for displaying an alert during the text-based chat communication, the alert being indicative that a first performance metric from among the plurality of performance metrics is outside a predetermined range of values; and means for displaying the first performance metric in a chat interface of the text-based chat communication.

According to some embodiments, the system further includes means for transmitting a plurality of prompts for retrieving additional performance metric data from the plurality of performance metrics.

According to some embodiments, the system further includes: means for monitoring the first performance metric data; and means for detecting the first performance metric is outside the predetermined range of values for triggering the alert.

According to some embodiments, the system further includes means for displaying the alert during the text-based chat communication in response to the first performance metric having a value above a predetermined threshold value.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

Figure 1:
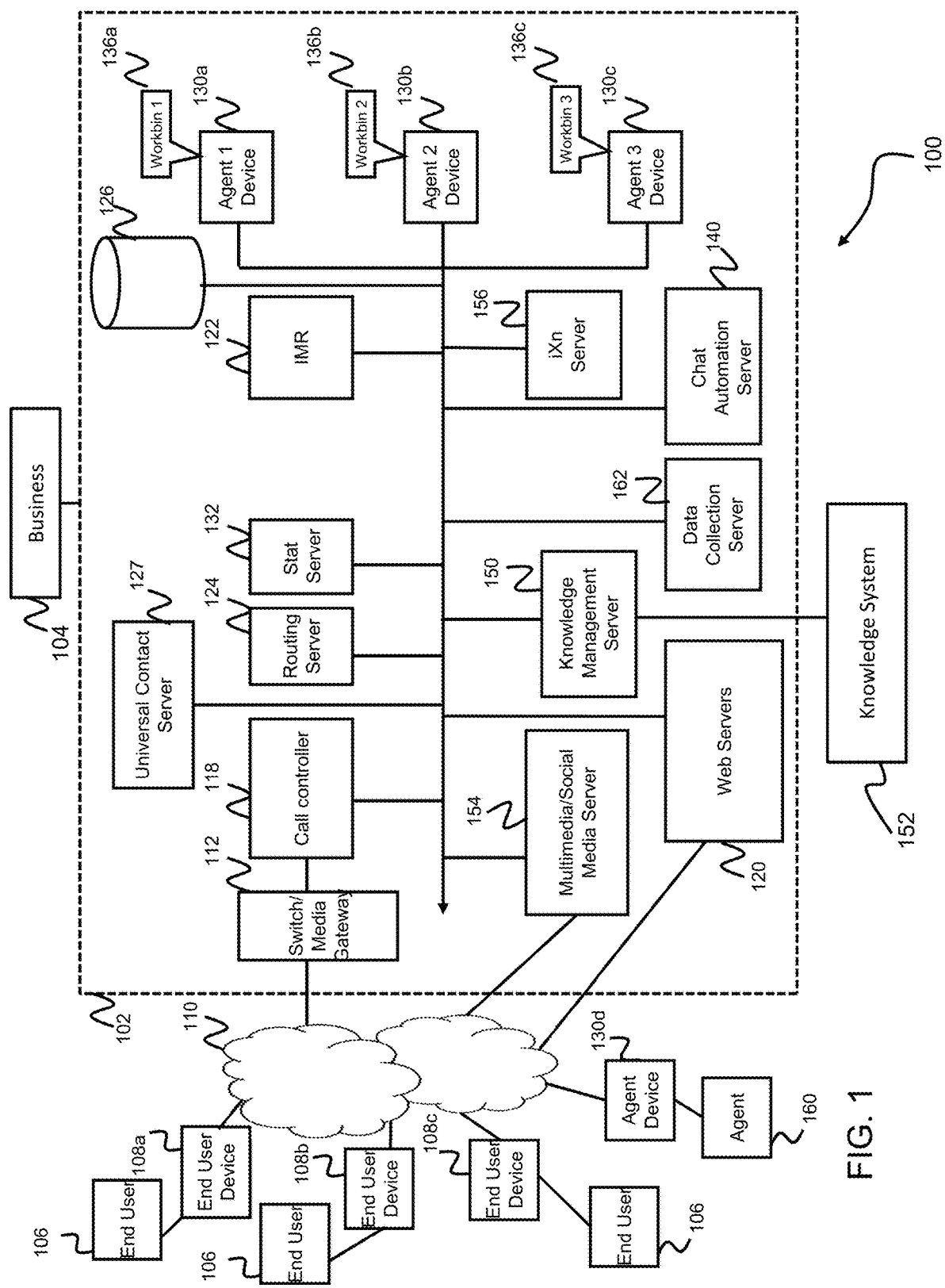
FIG. 1 is a block diagram of a contact center management system according to some embodiments of the present invention.

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Generally, modern contact centers are staffed with agents or employees who serve as an interface between an organization, such as a company, and outside entities, such as customers. For example, human sales agents at contact centers may assist customers in making purchasing decisions and may receive purchase orders from those customers. Similarly, human support agents at contact centers may assist customers in solving problems with products or services provided by the organization. Interactions between contact center agents and outside entities (customers) may be conducted by speech voice (e.g., telephone calls or voice over IP or VoIP calls), video (e.g., video conferencing), text (e.g., emails and text chat), or through other media.

In order to remain competitive, however, businesses constantly strive to provide high quality service to customers while keeping overhead costs low and maintaining or growing revenue and profitability. To that end, sophisticated businesses strive to monitor and maintain data regarding a wide variety of performance metrics of the business overall as well as the operations of individual aspects of the business. For example, in the context of contact center systems, businesses may monitor and collect data regarding wait and hold time for customers, idle time for agents, technical support quality, sales and marketing activities, and the like. Managers and supervising agents may access such data periodically in order to stay informed about the business goals of the contact center, to correct problems as they occur, and to generally ensure the contact center is performing at a high level. In many instances, various agents of the contact center system may wish to collaborate with one another to correct, improve, or maintain one or more performance metrics monitored by the contact center system.

Embodiments of the present invention provide a system and method to enable agents to view and share relevant performance metric data in real time, while also providing a convenient platform for agents to view and discuss the performance metric data even when the agents are located in different geographic locations.

In the various embodiments, the terms interaction and communication are used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

FIG. 1 is a block diagram of a system for engaging and managing conversations between an automated chat robot and human users (hereinafter referred to as a contact center management system 100), according to some embodiments of the present invention. In some embodiments, the contact center management system 100 may operate as part of a contact center system 102. The contact center system may be an in-house facility to a business or enterprise 104 for serving the enterprise in performing the functions of sales and service relative to the products and services available through the enterprise. In another aspect, the contact center system 102 may be operated by a third-party service provider. According to another embodiment, the contact center system 102 may operate as a hybrid system in which some components of the contact center system 102 are hosted at the contact center premise and other components are hosted remotely (e.g., in a cloud-based environment). The contact center system 102 may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center may also be distributed across various geographic locations and computing environments and not necessarily contained in a single location, computing environment, or even computing device.

According to one example embodiment, the contact center system 102 includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers or end users, e.g., end user 106) desiring to receive services from the contact center system 102 or the business 104 may initiate an inbound communication to the contact center system 102 via their end user devices 108a-108c (collectively referenced as electronic device 108).

Each of the electronic devices 108 may be a communication device conventional in the art, such as, for example, a telephone, wireless phone, smart phone, personal computer, electronic tablet, and/or the like, that is configured to engage in text-based (e.g., chat) communications with other electronic devices. According to some embodiments, users operating the electronic devices 108 may communicate with the contact center system 102 by way of a voice channel, and the communication may be converted into text either at the end user or contact center side. The text may then be transmitted to a chat bot (described in more detail below), and the response from the chat bot may be converted back into speech or delivered to the end user's device as text. Users operating the electronic devices 108 may initiate, manage, and respond to telephone calls, emails, chats, text messaging, web-browsing sessions, and other multi-media transactions.

Inbound and outbound communications from and to the electronic devices 108 may traverse the telephone, cellular, and/or data communication network 110 depending on the type of device that is being used. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, and/or any 3G or 4G network conventional in the art.

According to one exemplary embodiment, the contact center system 102 includes a switch/media gateway 112 coupled to the communications network 110 for receiving and transmitting telephony interactions between end users and the contact center system 102. The switch/media gateway 112 may include a telephony switch or communication switch configured to function as a central switch for agent level routing within the center. The switch may be a hardware switching system or a soft switch implemented via software. In this regard, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call controller 118 which may, for example, serve as an adapter or interface between the switch and the remainder of the routing, monitoring, and other communication-handling components of the contact center.

The call controller 118 may be configured to process PSTN calls, VoIP calls, and the like. For example, the call controller 118 may be configured with computer-telephony integration (CTI) software for interfacing with the switch/media gateway and contact center equipment. In one embodiment, the call controller 118 may include a session initiation protocol (SIP) server for processing SIP calls. According to some exemplary embodiments, the call controller 118 may, for example, extract data about the customer interaction such as the caller's telephone number, often known as the automatic number identification (ANI) number, or the customer's internet protocol (IP) address, or email address, and communicate with other CC components in processing the interaction.

According to one exemplary embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a variety of media channels including voice. Taking voice as an example, however, the IMR server may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open ended question such as, for example, "How can I help you?" and the customer may speak or otherwise enter a reason for contacting the contact center. The customer's response may then be used by the routing server 124 to route the call or communication to an appropriate contact center system 102 resource.

If the communication is to be routed to an agent, the call controller 118 interacts with a routing server 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server 132.

In some embodiments, the routing server 124 may query a customer database, which stores information about existing clients, such as contact information, service level agreement (SLA) requirements, nature of previous customer contacts and actions taken by contact center to resolve any customer issues, and the like. The database may be managed by any database management system conventional in the art, such as Oracle, IBM DB2, Microsoft SQL server, Microsoft Access, PostgreSQL, MySQL, FoxPro, NoSQL, SQLite, and the like, and may be stored in a mass storage device 126. The routing server 124 may query the customer information from the customer database via an ANI or any other information collected by the IMR 122.

Once an appropriate agent is identified as being available to handle a communication, a connection may be made between the customer and an agent device 130a-130d (collectively referenced as 130) of the identified agent. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms. According to some embodiments, one or more agents or supervising agents 160 may operate one or more agent devices 130d in communication with the components of the contact center system 102 by way of the data communication network 110.

The contact center system may also include a multimedia/social media server 154 for engaging in media interactions other than voice interactions with the end user devices 108. The media interactions may be related, for example, to email, vmail (voice mail through email), chat, video, text-messaging, web, social media, co-browsing, and the like. In this regard, the multimedia/social media server 154 may take the form of any IP router conventional in the art with specialized hardware and software for receiving, processing, and forwarding multi-media events. According to some embodiments, the multimedia/social media server 154 may be configured to maintain chat conversations, generate chat transcripts, and determine whether or not a chat communication is completed (e.g., based on timeout or by a customer closing a chat window). Additionally, the multimedia/social media server 154 may be configured to keep a chat session alive even when a particular chat server instance crashes, and also process or facilitate chat transfers and conference sessions.

The web servers 120 may include, for example, social interaction site hosts for a variety of known social interaction sites to which an end user may subscribe, such as, for example, Facebook, Twitter, and the like. In this regard, although in the embodiment of FIG. 1 the web servers 120 are depicted as being part of the contact center system 102, the web servers may also be provided by third parties and/or be maintained outside of the contact center. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin 136a-136c (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one exemplary embodiment of the invention, the mass storage device(s) 126 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like.

According to one embodiment, some of the data (e.g. customer profile data) may be maintained in a customer relations management (CRM) database hosted in the mass storage device 126 or elsewhere. The mass storage device may take form of a hard disk or disk array, flash memory, magnetic table, or other suitable mass storage device as is conventional in the art, for storing information used as part of the contact center management system 100 and the contact center system 102.

According to some embodiments, the contact center system 102 may include a universal contact server (UCS) 127, configured to retrieve information stored in the CRM database and direct information to be stored in the CRM database. For example, the UCS 127 may be utilized as part of the contact center management system 100 to facilitate maintaining a history on how well a particular chat bot (described in more detail below) functions for a given customer as a reference for future chat communications. The UCS 127 may also be configured to facilitate maintaining a history of customers' preferences regarding media channels, such as instances in which chat communications are acceptable and instances in which customers prefer alternate media channels. Additionally, the UCS 127 may be configured to capture and store data regarding comments from agents, customer communication history, and the like.

The contact center system 102 may additionally include a knowledge management server 150 for facilitating interactions between customers operating the end user devices 108a-108c and a knowledge system 152 (which may be included as part of the contact center system 102, or may be operated remotely by a third party). The knowledge management server 152 is a computer system capable of receiving questions and providing answers as output. According to some example embodiments, the knowledge system may be embodied as IBM Watson®. Of course, any other knowledge system may be used as will be appreciated by a person having ordinary skill in the art. In some embodiments, the knowledge system 152 is an artificially intelligent computer system capable of answering questions posed in natural language by retrieving information from information sources such as encyclopedias, dictionaries, newswire articles, literary works, or other documents submitted to the knowledge system 152 as reference materials, as is well known in the art. Additional details of the knowledge management server is provided in U.S. application Ser. No. 14/449,018, filed on Jul. 31, 2014, entitled "System and Method for Controlled Knowledge System Management," the content of which is incorporated herein by reference.

The contact center system 102 may additionally include a chat server 140 for conducting automated/electronic chat communications with agents operating agent devices 130. According to some embodiments, the chat server 140 may operate as a chat orchestration server, dispatching actual chat conversations to various chat bots or agent chats. The processing logic of the chat server 140 may be rules driven, and may leverage, for example, intelligent workload distribution protocols and various business rules for routing communications.

According to some embodiments, the chat server 140 is coupled to and in communication with the interaction server 156, statistics server 132, a data collection server 162, the call controller 118, and/or the like, for retrieving data regarding ongoing contact center operations and performance metrics in real time. Although the chat server 140 is depicted in the embodiment of FIG. 1 as being a separate server component, a person of skill in the art should recognize that functionalities of the chat automation server may be incorporated into the multimedia/social media server 154, the knowledge management server 105, the IMR server 122, or the like.

The contact center system 102 may also include the data collection server 162 configured to retrieve data from various components of the contact center system such as, for example, the statistics server 132, and to generate reports from the aggregated data. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like). According to some example embodiments, the data collection server 162 may collect data from the components in the contact center system such as the statistics server 132 and the call controller 118 on a regular or pre-configured periodic schedule. The data collection server 162 may then operate to aggregate the data and generate graphical or text-based representations of performance metrics based on the retrieved data.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

Figure 2A:
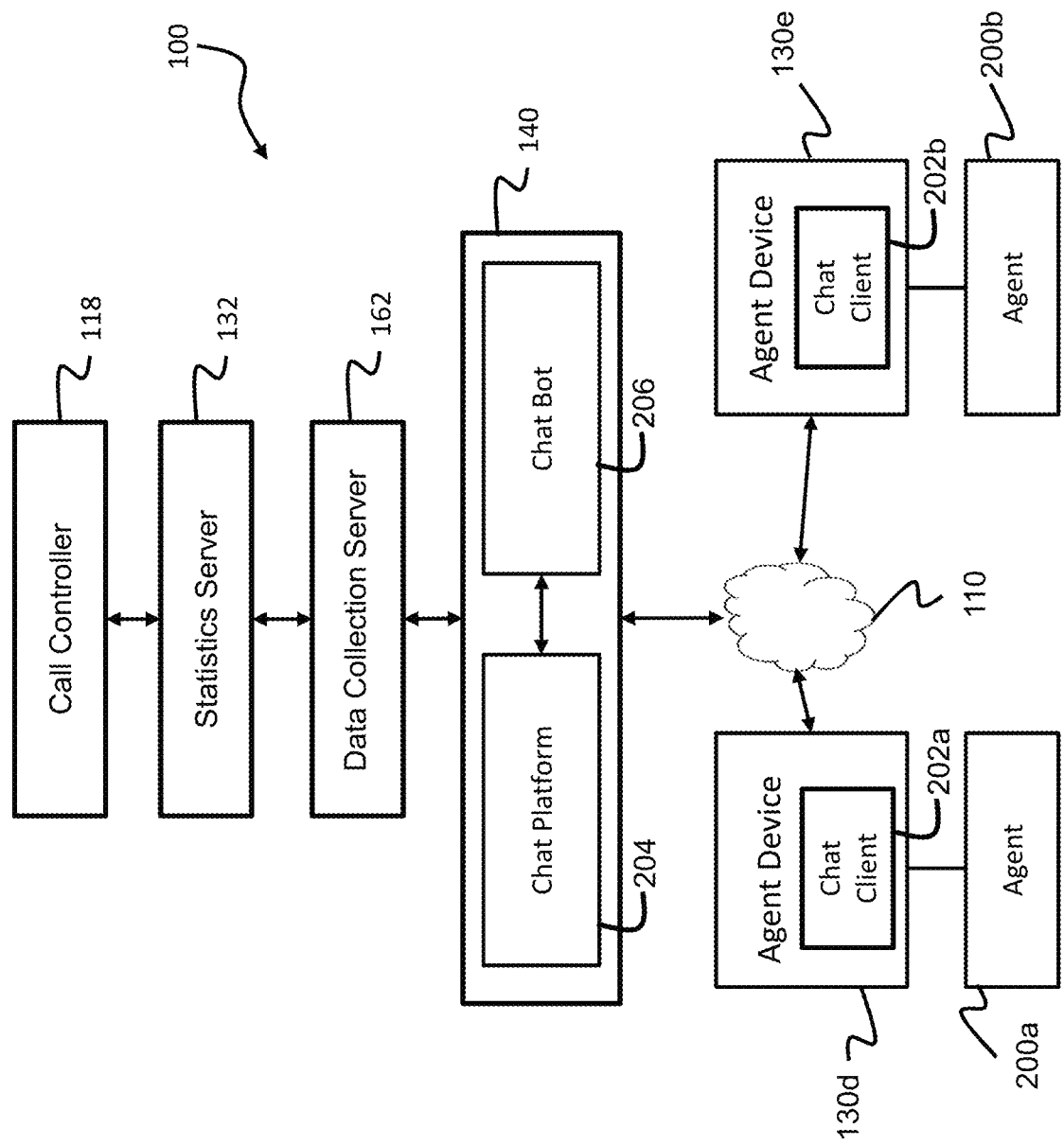
FIGS. 2A and 2B are block diagrams of some components of the contact center management system, according to some example embodiments of the present invention.

FIG. 2 is a more detailed block diagram of some components of the contact center management system, according to some example embodiments of the present invention. The chat server 140 is coupled to or in electronic communication with one or more agent devices 130 (e.g., agent devices 130d and 130e) operated by one or more agents 200 (e.g., agents 200a and 200b, respectively) over the data communications network 110 and/or operating locally within the contact center system 102.

Each agent device 130 may have a communication or chat client or module 202 (e.g., modules 202a and 202b) operating locally on the agent device as a user interface for exchanging communications with other agent devices and the chat server 140 by way of a chat platform module 204. According to some embodiments, the chat client or module 202 may be configured to provide a graphical user interface for exchanging graphical and/or text-based communications with the chat server 140. The chat platform module 204 operates as an intermediary for receiving and transmitting information received from and to agent devices, a chat automation module (or chat bot) 206, and other components of the contact center system 102 (e.g., the data collection server 162, the statistics server 132, and the call controller 118).

The chat bot 206 operates to provide automated messages for display in response to the input from agent devices based on performance metric data received from various components of the contact center system 102 (e.g., the data collection server 162, the statistics server 132, and the call controller 118). According to one embodiment, the chat bot 206 is agnostic, and utilizes an analytical platform for analyzing inbound text and generating output text based on performance metric data. In one example, the chat bot 206 serves as a proxy for converting user requests to analytical systems and returning notifications and responses back to the chat dialog. Further detail of the chat bot 206 is described below with respect to FIG. 2B.

According to some embodiments, the chat bot 206 and the chat platform 204 may operate as part of the chat server 140, or may operate on independent servers, depending on the design of the contact center system 102.

The chat server 140 is further coupled to or in electronic communication with the data collection server 162. The data collection server 162 collects/retrieves data related to various performance metrics from various components of the contact center system 102, for example, the statistics server 132 and the call controller 118. As discussed above, according to some embodiments, the data collection server 162 may retrieve analytics and performance metric data from the statistics server 132 and/or the call controller 118 on a regular or pre-configured periodic schedule. Utilizing the data retrieved from the statistics server 132 and/or the call controller 118, the data collection server 162 may generate aggregated data and numerical data points representing one or more key performance indicators (KPIs) that are relevant to the business operations of the contact center.

The chat bot 206, through the chat server 140 may subscribe to one or more instances of the aggregated data or KPIs and deliver the data to the chat platform 204 for display to one or more agents through the chat client 202 accessible through the corresponding agent device 130.

As will be described in further detail below, the chat bot 206 may be configured to receive, as input data, messages transmitted from the agent devices 130, and use text analytics to identify keywords or phrases (e.g., predefined chat commands), or selection of one or more prompts. In one embodiment, the chat bot 206 is a participant of the chat session conducted among the aged devices 130. In response to detecting a keyword or phrase or the selection of a prompt during the chat session, the chat bot 206 may retrieve additional performance metric data or one or more additional prompts for further exploration and analysis of relevant performance metric data by the agents.

For example, the chat bot 206 may subscribe to performance metric data generated and/or aggregated by the data collection server 162 regarding agent utilization parameters. The data collection server 162 may pull and aggregate such data in real time on a regular basis (e.g., every minute) from the statistics server 132, and generate a numerical percentage or bar chart for easy comprehension and analysis. In response to receiving or detecting a request from an agent for a particular piece of performance metric data, the chat bot 206 may request the information from the data collection server 162, which aggregates and caches the relevant data received from other components in the contact center system 102 (e.g., the statistics server 132 and/or the call controller 118) When a user requests agent utilization, the chat server 140 will request this information from the data collection server 162 that caches information from the statistics server 132 and provides it via chat to the user.

Figure 2B:
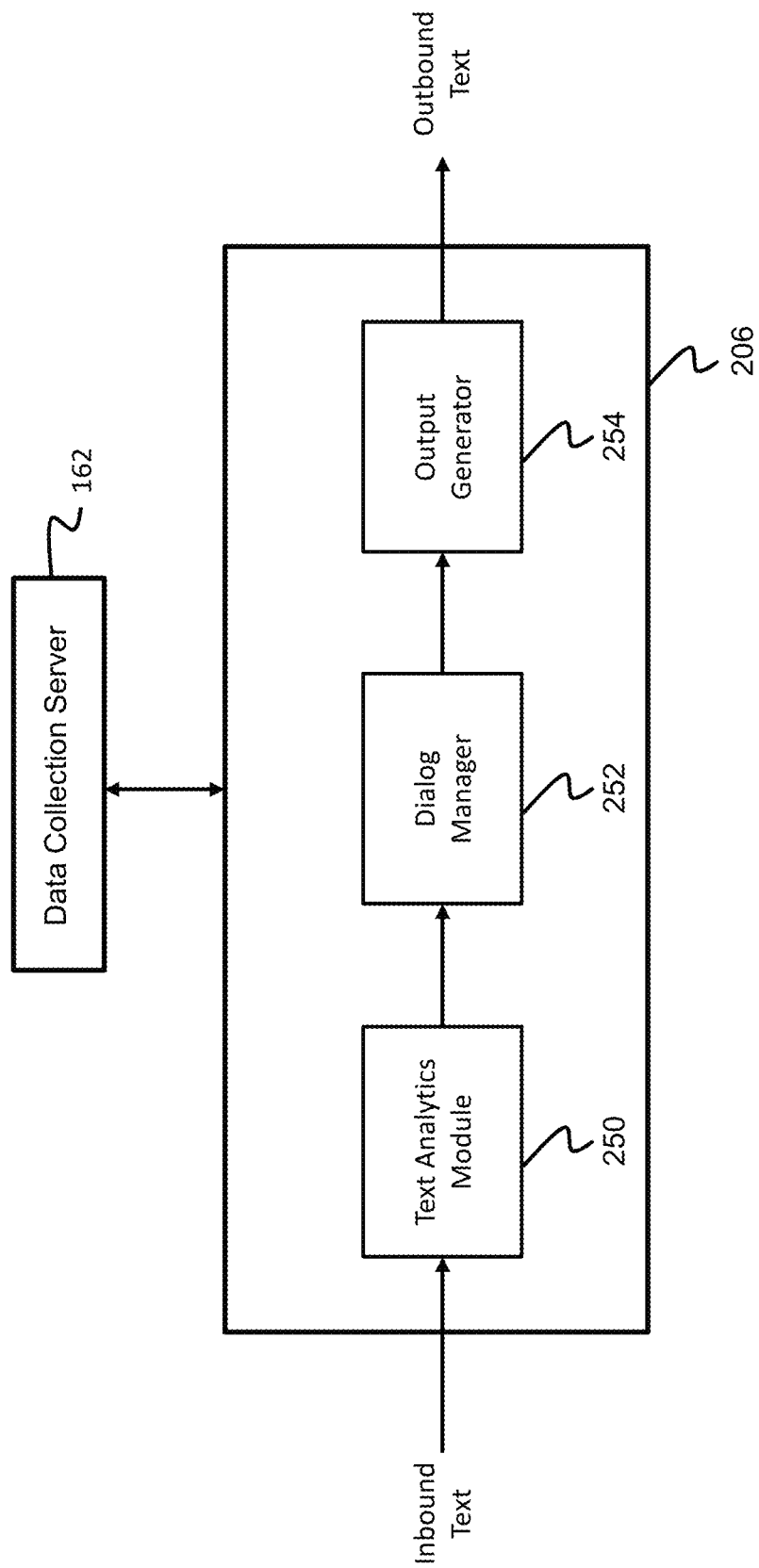

FIG. 2B is a more detailed block diagram of the chat bot 206 operating as part of the contact center management system, according to some example embodiments of the present invention. According to some example embodiments, the chat bot 206 may include a text analytics module 250, a dialog manager 252, and an output generator 254. The text analytics module is configured to analyze and understand natural language. In this regard, the text analytics module may be configured with a lexicon of the language, a syntactic/semantic parser, and grammar rules for breaking a phrase provided by the agent device 130, into an internal syntactic and semantic representation.

The dialog manager 252 receives the syntactic and semantic representation from the text analytics module, and manages the general flow of the conversation based on a set of decision rules. In this regard, the dialog manager maintains history and state of the conversation, and generates an outbound communication based on the history and state.

The dialog manager 252 selects a response deemed to be appropriate at the particular point of the conversation in response to the inbound text and data received or retrieved from the data collection server 162, and outputs the response to the output generator 254. For example, according to some embodiments, the text analytics module 250 and/or the dialog manager 252 may detect, based on text analytics of the chat communication session between agents, that a particular phrase has been used or topic of conversation has come up. Alternatively, the text analytics module 250 and/or the dialog manager 252 may detect an agent inputting a predetermined command or phrase to the chat interface. According to some embodiments, the chat automation server 140 may receive data from the data collection server 162 regarding one or more key performance indicators (e.g., agent idle rate, customer wait times, sales, product performance, etc.). In response to the data of a key performance indicator falling below a predetermined threshold, the chat automation server 140 may provide an alert to a chat client of one or more of the agent devices indicating the status of the key performance indicator. For example, according to some embodiments, agents may be subscribed to receive alerts on their agent device for one or more key performance indicators. That is, some agents may be subscribed to receive alerts for one key performance indicator, and other agents may be subscribed to receive alerts for a different key performance indicator. In each case, the dialog manager 252 may be configured to detect a topic of conversation, an input command, and/or input data regarding a key performance indicator, and generate a corresponding output text or prompt.

The output generator 254 takes the semantic representation of the response provided by the dialog manager 252 and outputs an outbound text to be displayed at the agent device 130.

Figure 3:
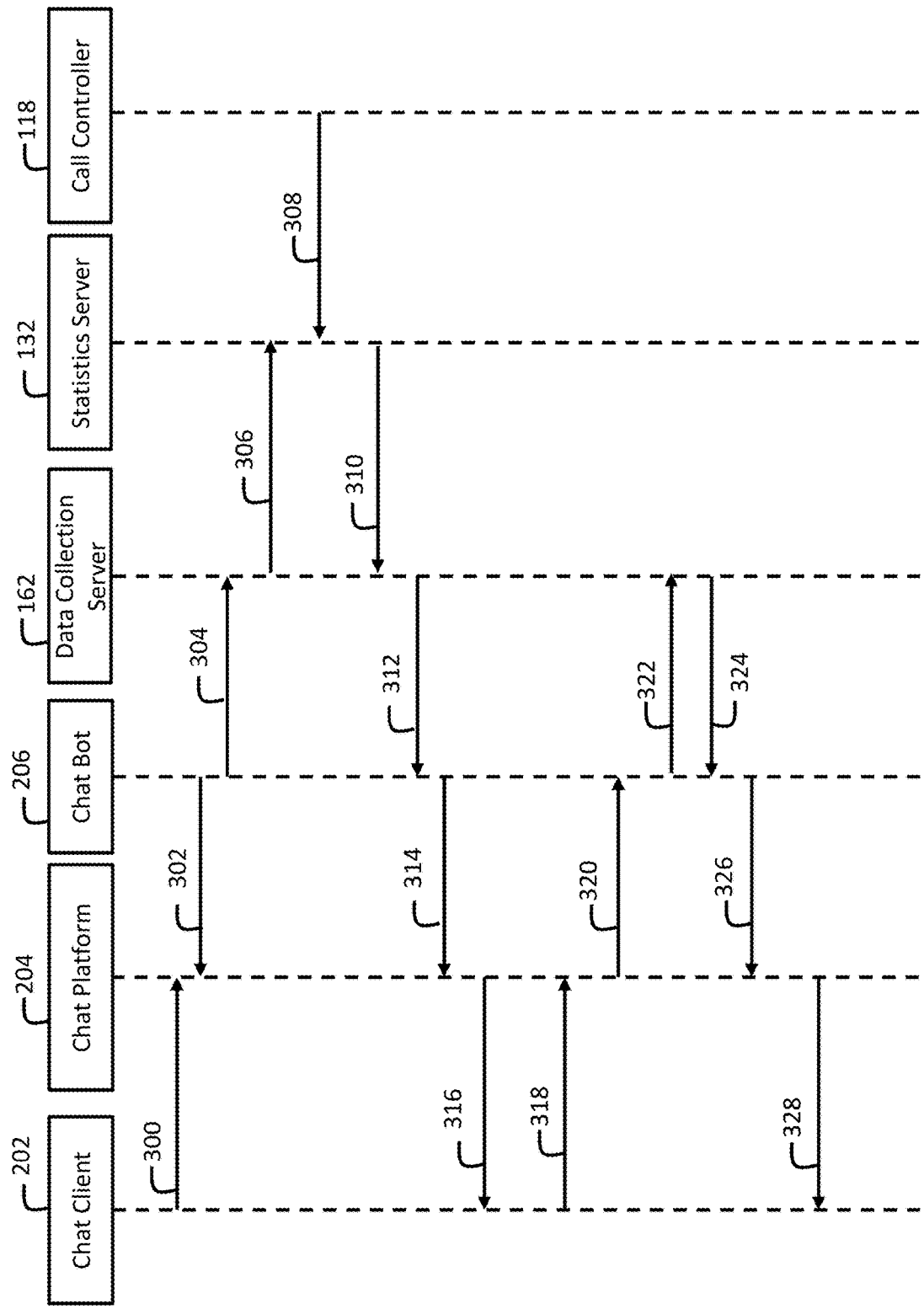
FIG. 3 is a flow chart illustrating interactions between various components operating as part of a method for managing a contact center system, according to some example embodiments of the present invention.

FIG. 3 is a flow chart illustrating interactions between various components operating as part of a method for managing a contact center system, according to some example embodiments of the present invention. As illustrated in FIG. 3, at 300, one or more chat clients 202 may connect to the chat platform 204 to initiate a chat group or chat communication session. At 302, the chat bot 206 may connect to the chat platform 204 to join the chat communication session. Additionally, at 304, the chat bot 206 may connect to the data collection server 162 for retrieving performance metric data from the data collection server 162.

At 306, the data collection server subscribes to retrieve statistical data from the statistics server 132, and at 308, the call controller 118 transmits relevant communication data to the statistics server 132. At 310, the statistics server 132 transmits the data from the statistics server 132 and the call controller 118 to the data collection server 162. According to some embodiments, the call controller 118 may directly transmit the relevant communication data to the data collection server 162.

At 312, the data collection server transmits performance metrics data to the chat bot 206, and at 314, the chat bot transmits a message or alert to the chat platform 204 for display to the one or more agents involved in the chat communication session at 316.

At 318, the agent may transmit a request for additional information, for example, by entering a keyword or phrase into the chat client, or by selecting a prompt initiated by the chat bot 206. For example, in response to an alert that agent idle time has risen to an undesirable level, a supervising agent may transmit a request to view additional information indicating the volume of incoming customer communications so that the supervising agent can decide whether or not to reorganize agent workload or staffing. According to some embodiments, the chat bot 206 may be configured to identify keywords or phrases based on text analytics. In some embodiments, keywords or phrases may have a predetermined or predefined format in order to the chat bot 206 to identify the keyword of phrase. Alternatively, according to some embodiments, the chat bot 206 may be configured to utilize text analytics to identify freeform language (e.g., without a predefined format) input as a command or phrase to trigger a response chat from the chat bot 206. The request for the additional performance metric data is transmitted by the chat platform 204 to the chat bot 206, at 320. At 322, the chat bot 206 requests the additional performance metric data from the data collection server 162, and at 324, the data collection server 162 transmits the data to the chat bot 206. At the 326, the chat bot 206 transmits, at 328, the additional performance metric data to the chat platform 204 for display on the agent device by way of the chat client 202.

Figure 4:
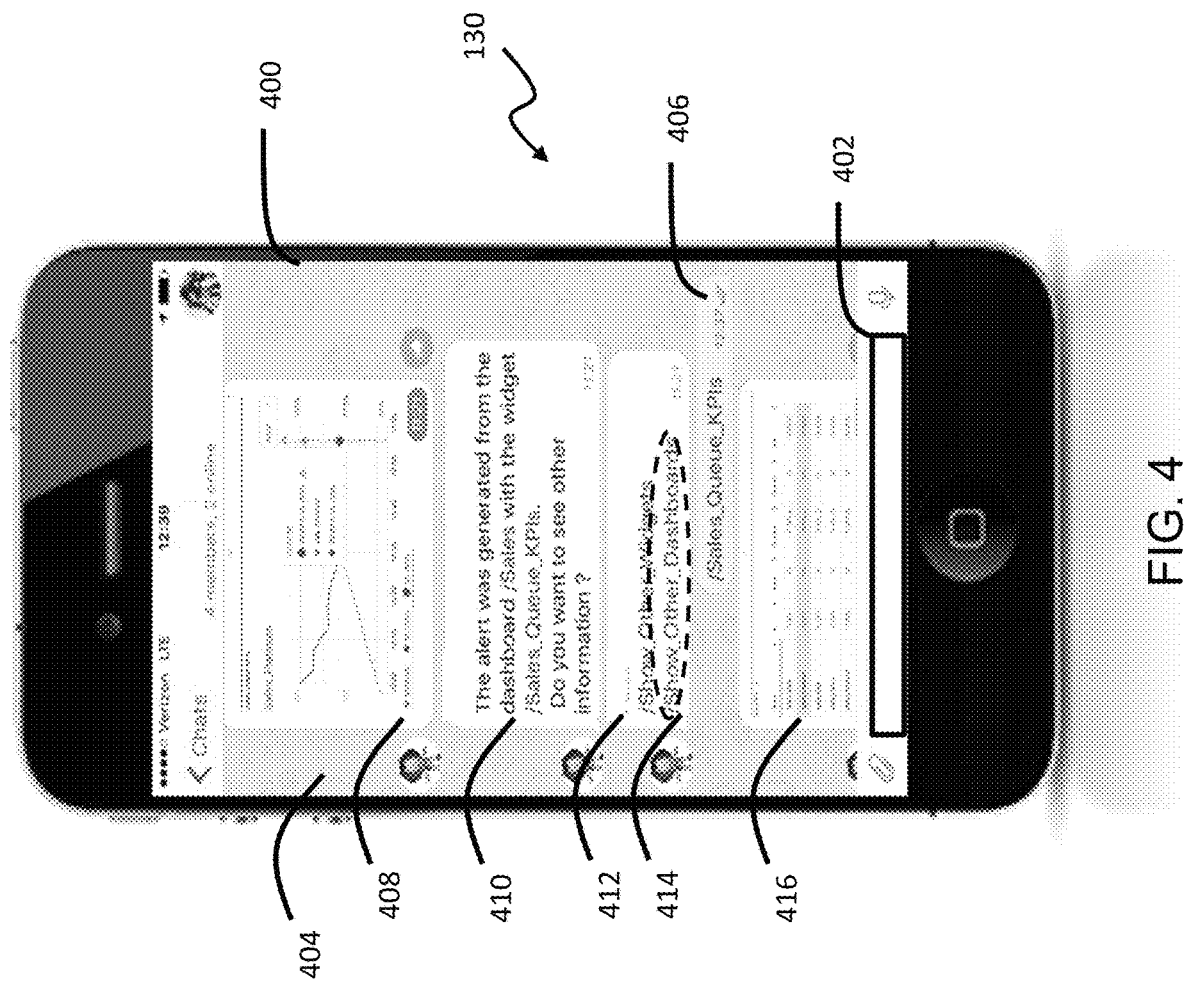
FIG. 4 illustrates an example user interface during an interaction with the contact center system, according to some example embodiments of the present invention.

FIG. 4 illustrates aspects of an example user interface during an interaction with the contact center system, according to some example embodiments of the present invention. As illustrated in FIG. 4, a chat communication interface 400 may be displayed on a display of an agent device 130. The chat communication interface 400 may include either the actual chat, or may also be wrapped, for example, by a voice layer that is converted into chat through active speech recognition (ASR). In such instances, the returned chat response may be converted into voice through a text-to-speech (TTS) conversion process.

The chat communication interface 400 may include an input field 402, into which the agent may enter or type text. The chat communication interface 400 may further include a communication summary or transcript field 404, for displaying the text or data from one or more agents (e.g., as illustrated in dialog box 406) and text or data from the chat bot 206 (e.g., as illustrated in dialog boxes 408-412).

According to some embodiments of the present invention, chat automation server 140 may perform text analytics on the input received from the agent device 130 by way of the chat communication interface 400 in order to proactively deliver alerts or data in response to text or input received from the agent device 130. Additionally, the chat automation server 140 (e.g., by way of the chat bot 206) may detect, for example, that the value of a particular performance metric has fallen below a predetermined threshold value and issue an alert displaying the state or value of the performance metric (e.g., as illustrated in dialog box 408). The chat automation server 140 may additionally provide one or more prompts 414 for suggesting retrieval of additional data or performance metric information. According to some embodiments, the prompts 414 may be selected from a list of preset or predetermined prompts according to the input received from the agent device 130 or the detection of a performance metric falling below a predetermined threshold. For example, a predetermined phrase or command received from an agent, or a particular performance metric value, may be associated with one or more preset prompts, and each of those preset prompts may further be associated with one or more additional preset prompts, and so on, such that the chat automation server 140 is configured to guide the agents through a logical path of relevant data points to resolve an issue. According to some embodiments, the prompts 414 may be displayed within the communication summary or transcript field 404 of the chat communication interface 400 during the chat communication.

In some embodiments, such prompts may be in response to input from the agent, or the chat automation server 140 may deliver a plurality of prompts that may logically follow from performance metric data already retrieved. For example, if the chat automation server 140 displays data indicating wait times for customers are undesirably long, the chat automation server 140 may display one or more prompts 414 to prompt the agent to request retrieval of performance metric data regarding the number of agents currently logged into their work station, the number of agents currently handling a customer interaction, the number of agents on break, and so forth.

According to some embodiments, the chat automation server 140 may be configured to detect selection by an agent of one of the prompts 414, and/or may be configured to identify certain predefined keywords or phrases (e.g., chat commands) provided by the agent (e.g., as illustrated in box 406) for requesting performance metric data. In response to detecting and identifying the agent input, either by selection of a prompt 414 or by entering a keyword or phrase, the chat automation server 140 may provide one or more additional or follow-up prompts, or may retrieve the relevant performance metric data for display in the chat communication interface 400 (as illustrated in box 416).

According to some embodiments, multiple agents can simultaneously communicate with one another by way of the chat communication interface 400 displayed on their respective agent devices 130, and at the same time each agent can interact with the chat server 140 (and the chat bot 206) for retrieving and viewing relevant performance metric data. Accordingly, embodiments of the present invention provide a system and method for enabling agents to communicate with one another and also view and monitor performance metric data relevant to the management of a contact center system.

According to some embodiments, an agent operating an agent device 130 may be enabled to query the chat server 140 for retrieval of various statistical and performance metric data, and quickly generate reports that can automatically be transmitted to or shared with team members by the chat server 140 for access control to information. Additionally, according to some embodiments, any agent connected to an individual chat session may be enabled to send a request for statistical information and all responses would be visible to all chat participants.

According to some embodiments, different agents or supervisors may be subscribed to different chat groups and may receive notifications or alerts in response to input from other agents in the chat group or in response to the chat server 140 detecting an alert trigger. An alert trigger may include situations in which the value of a predetermined performance metric falls below a predetermined threshold value.

In cases in which a performance metric has fallen below a threshold level, the chat server 140 may facilitate troubleshooting or resolution by supervising agents by prompting agents involved in the chat group or chat session to review additional related data as discussed above. For example, at a high level, service level drops may be examined as an issue that is visible to customers. Low lever details (such as long wait times and high abandon rates) would allow supervising agents to understand actual bottlenecks in the contact center.

The hierarchical relationship between information and follow-up prompts may be predefined, and displayed to supervising agents in response to previous data or user input. According to some embodiments, the chat server 140 may additionally provide suggestions for actions to be taken by supervising agents based on alerts or problems. For example, the chat server 140 may suggest an alternative routing strategy for redistributing the load of incoming customer communications or reassigning agents to different work groups in order to redistribute work load.

Figure 5:
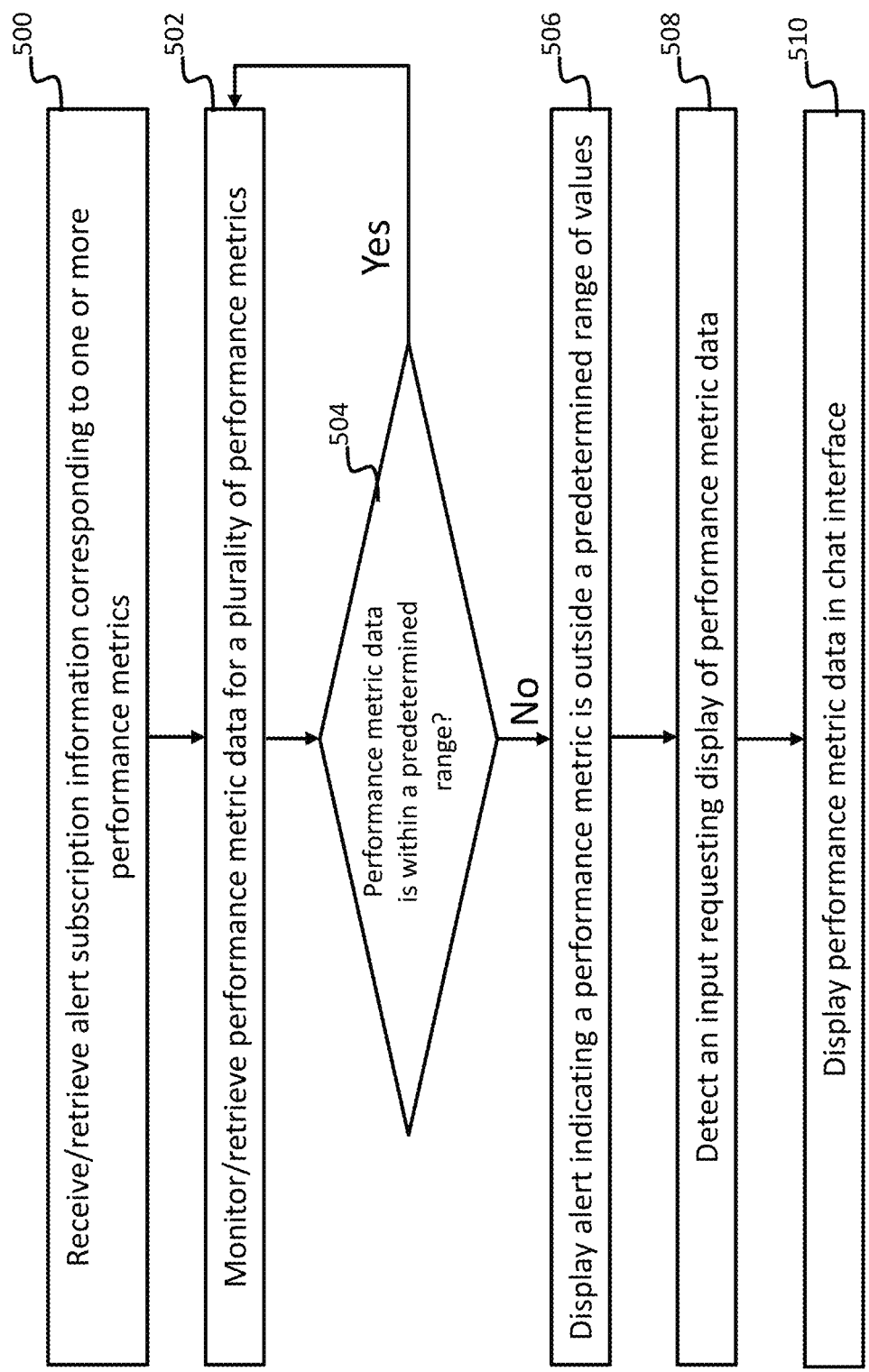
FIG. 5 is a flow diagram illustrating a process for managing a contact center system, according to some example embodiments of the present invention.

FIG. 5 is a flow diagram illustrating a process for managing a contact center system, according to some example embodiments of the present invention. At 500, the contact center management system 100 receives and/or retrieves (e.g., from memory 126) alert subscription information corresponding to one or more performance metrics. In particular, individual agents 136 may transmit a signal (e.g., through the chat client 202 and/or the chat automation server 140) to the contact center management system 100 to subscribe to receive alerts or notifications regarding one or more performance metrics. For example, a supervising agent in charge of monitoring agent performance and productivity may subscribe to receive notifications when the average idle time for agents exceeds a certain predetermined threshold, thereby enabling the supervising agent to take corrective action. The data regarding the alert subscriptions may be stored in memory (e.g., memory 126), and retrieved by the contact center management system 100.

At 502, the contact center management system 100 may then monitor and/or retrieve performance metric data for a plurality of performance metrics according to the subscription data or alert subscriptions of the agents. Then, at 504, the contact center management system 100 determines whether or not the performance metric data is within a predetermined range of values. If yes, the contact center management system 100 returns to 502 and continues to monitor the performance metric data according to the alert subscriptions of each of the agents. Alternatively, if the contact center management system 100 determines the performance metric data is outside a predetermined range of values (e.g., above or below a predetermined threshold value, depending on the performance metric being monitored), the contact center management system 100 may proceed, at 506, to display an alert in a chat window or chat interface of a corresponding agent's chat client 202. According to some embodiments, the alert may also be displayed in a chat client 202 of one or more additional agents (e.g., team members or subordinates of the first agent subscribed to receive the alert). Additionally, according to some embodiments, the contact center management system 100 may display, in the chat communication window, one or more prompts for suggesting additional follow-up information to be displayed, as discussed above.

At 508, the system monitors for and/or detects whether or not any input is received from any agent communicating in a the chat communication session requesting display of additional performance metric data. For example, according to some embodiments, during a chat communication session between two agents, the contact center management system 100 may identify or detect, using text analytics, by identifying a predetermined keyword or phrase, or by identifying user selection of a prompt, an input from one or more agents requesting additional or related performance metric data. Then, at 510, the contact center management system 100 may display performance metric data related to the alert and/or the requested additional data.

Thus, embodiments of the present invention provide intelligence to agents in a chat group to give them in real-time information about what is going on within the contact center, and provide a platform for managing and troubleshooting the operating of the contact center system.

In one embodiment, each of the various servers, controllers, switches, gateways, engines, and/or modules (collectively referred to as servers) in the afore-described figures are implemented via hardware or firmware (e.g. ASIC) as will be appreciated by a person of skill in the art.

In one embodiment, each of the various servers, controllers, switches, gateways, engines, and/or modules (collectively referred to as servers) in the afore-described figures is a process or thread, running on one or more processors, in one or more computing devices 1500 (e.g., FIG. 6A, FIG. 6B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 6A:
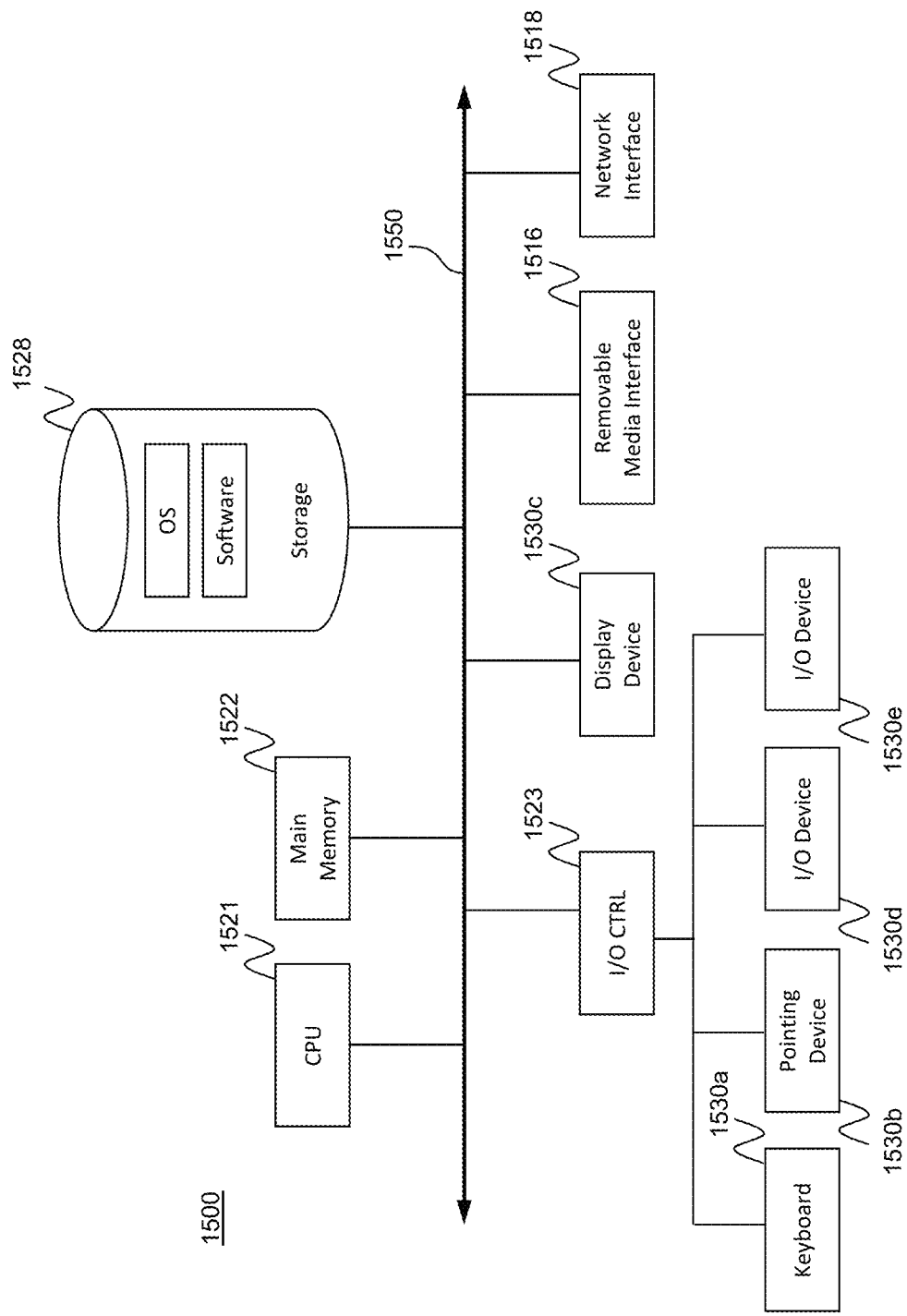
FIG. 6A is a block diagram of a computing device according to an embodiment of the present invention.
Figure 6B:
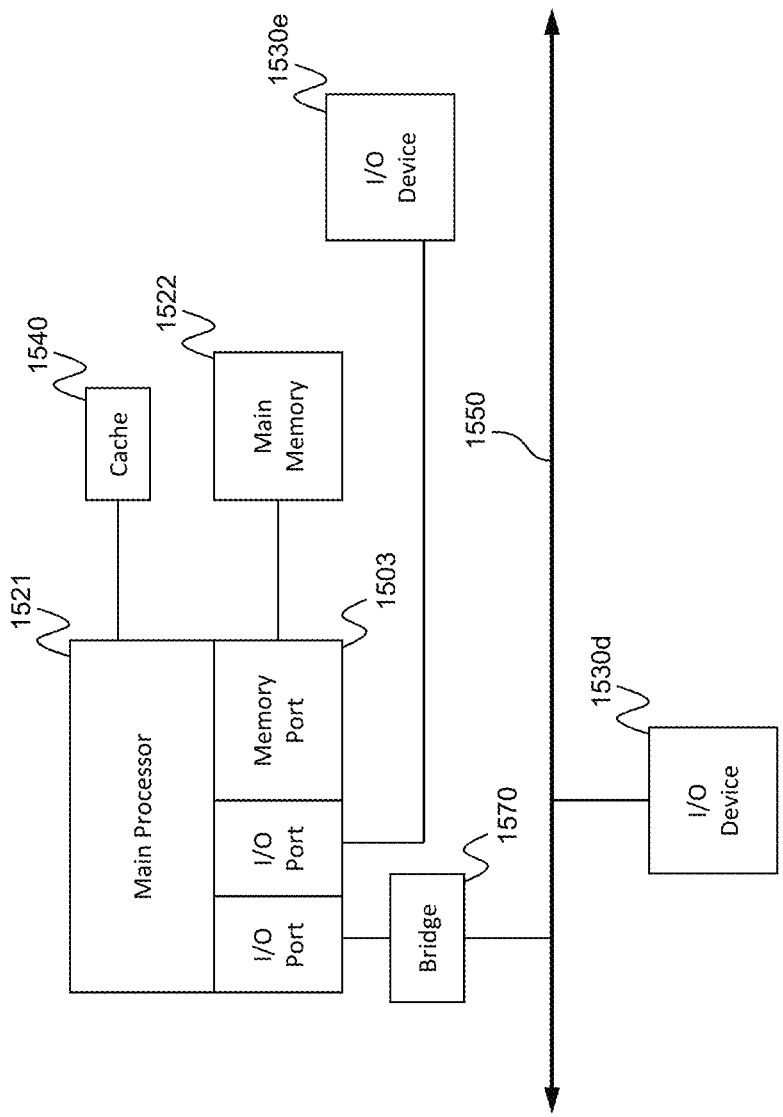
FIG. 6B is a block diagram of a computing device according to an embodiment of the present invention.

FIG. 6A and FIG. 6B depict block diagrams of a computing device 1500 as may be employed in exemplary embodiments of the present invention. Each computing device 1500 includes a central processing unit 1521 and a main memory unit 1522. As shown in FIG. 6A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 6B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 6A, the central processing unit 1521 communicates with the main memory 1522 via a system bus 1550. As shown in FIG. 6B, the central processing unit 1521 may also communicate directly with the main memory 1522 via a memory port 1503.

FIG. 6B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 6A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 6B depicts an embodiment of a computer 1500 in which the central processing unit 1521 communicates directly with I/O device 1530e. FIG. 6B also depicts an embodiment in which local busses and direct communication are mixed: the central processing unit 1521 communicates with I/O device 1530*d* using a local system bus 1550 while communicating with I/O device 1530*e* directly.

A wide variety of I/O devices 1530 may be present in the computing device 1500. Input devices include one or more keyboards 1530*a*, mice, trackpads, trackballs, microphones, and drawing tablets. Output devices include video display devices 1530*c*, speakers, and printers. An I/O controller 1523, as shown in FIG. 6A, may control the I/O devices. The I/O controller may control one or more I/O devices such as a keyboard 1530*a* and a pointing device 1530*b*, e.g., a mouse or optical pen.

Referring again to FIG. 6A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530*c*, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530*c* by the computing device 1500. For example, the computing device 1500 may include any type and/or form of video adapter, video card, driver, and/or library to interface, communicate, connect or otherwise use the display devices 1530*c*. In one embodiment, a video adapter may comprise multiple connectors to interface to multiple display devices 1530*c*. In other embodiments, the computing device 1500 may include multiple video adapters, with each video adapter connected to one or more of the display devices 1530*c*. In some embodiments, any portion of the operating system of the computing device 1500 may be configured for using multiple display devices 1530*c*. In other embodiments, one or more of the display devices 1530*c* may be provided by one or more other computing devices, connected, for example, to the computing device 1500 via a network. These embodiments may include any type of software designed and constructed to use the display device of another computing device as a second display device 1530*c* for the computing device 1500. One of ordinary skill in the art will recognize and appreciate the various ways and embodiments that a computing device 1500 may be configured to have multiple display devices 1530*c*.

A computing device 1500 of the sort depicted in FIG. 6A and FIG. 6B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 6D:
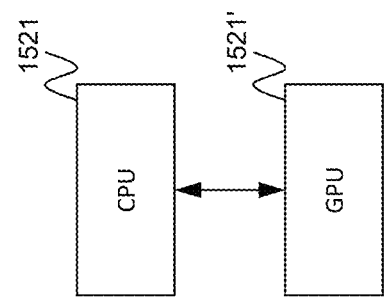
FIG. 6D is a block diagram of a computing device according to an embodiment of the present invention.
Figure 6C:
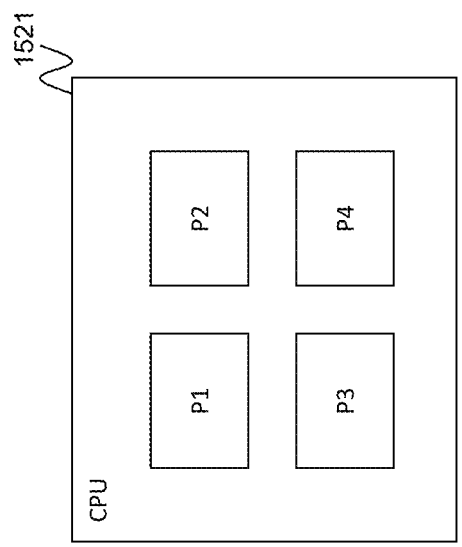
FIG. 6C is a block diagram of a computing device according to an embodiment of the present invention.

As shown in FIG. 6C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 6D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 6E:
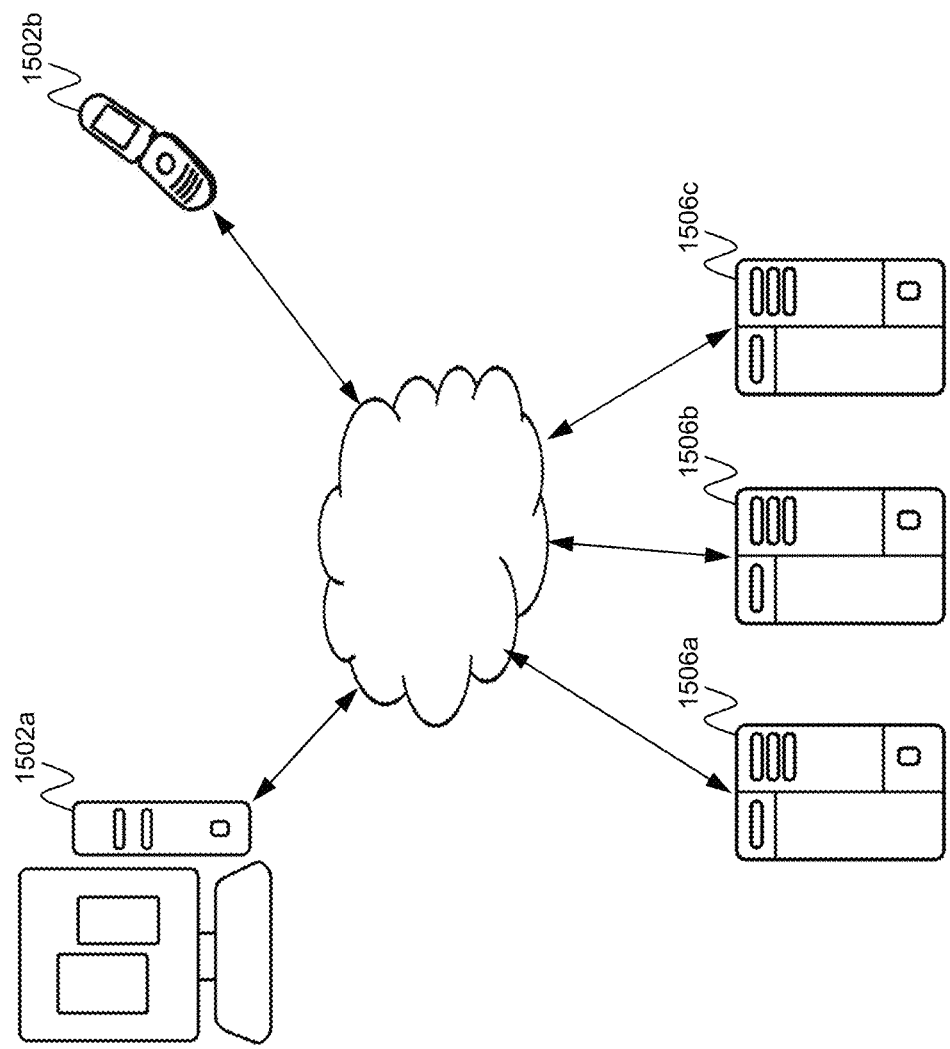
FIG. 6E is a block diagram of a network environment including several computing devices according to an embodiment of the present invention.

A computing device may be one of a plurality of machines connected by a network, or it may comprise a plurality of machines so connected. FIG. 6E shows an exemplary network environment. The network environment comprises one or more local machines 1502*a*, 1502*b* (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506*a*, 1506*b*, 1506*c* (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 6E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 6E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

Although this invention has been described in certain specific embodiments, those skilled in the art will have no difficulty devising variations to the described embodiment, which in no way depart from the scope and spirit of the present invention. Furthermore, to those skilled in the various arts, the invention itself herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A method for managing a contact center system, the method comprising:
   retrieving, by a processor, performance metric data for a plurality of performance metrics of the contact center system;
   retrieving, by the processor, alert subscription data corresponding to a first agent regarding the plurality of performance metrics;
   initiating, by the processor, a text-based chat communication with the first electronic device operated by a first agent;
   displaying, by the processor, an alert during the text-based chat communication according the alert subscription data, the alert being indicative that a first performance metric from among the plurality of performance metrics is outside a predetermined range of values; and
   displaying, by the processor, the first performance metric in a chat interface of the text-based chat communication.

2. The method of claim 1, further comprising transmitting, by the processor, a plurality of prompts for retrieving additional performance metric data from the plurality of performance metrics.

3. The method of claim 1, further comprising:
   monitoring, by the processor, the first performance metric data; and
   detecting, by the processor, the first performance metric is outside the predetermined range of values for triggering the alert.

4. The method of claim 1, further comprising detecting, by the processor, an input from the first electronic device requesting display of the performance metric.

5. The method of claim 1, further comprising displaying, by the processor, the alert during the text-based chat communication in response to the first performance metric having a value above a predetermined threshold value.

6. The method of claim 1, further comprising displaying, by the processor, the alert during the text-based chat communication in response to the first performance metric having a value below a predetermined threshold value.

7. The method of claim 1, further comprising monitoring, by the processor, input from an agent device during the text-based chat communication.

8. The method of claim 7, further comprising, in response to detecting the input is indicative of a request to data corresponding to a second performance metric, displaying, by the processor, the second performance metric data in the chat interface of the text-based chat communication.

9. A system for managing a contact center system, the system comprising:
   a processor; and
   a memory coupled to the processor, wherein the memory stores instructions that, when executed by the processor, cause the processor to:
      retrieve performance metric data for a plurality of performance metrics of the contact center system;
      retrieve alert subscription data corresponding to a first agent regarding the plurality of performance metrics;
      initiate a text-based chat communication with a first electronic device operated by the first agent;
      display an alert during the text-based chat communication according the alert subscription data, the alert being indicative that a first performance metric from among the plurality of performance metrics is outside a predetermined range of values; and
      display the first performance metric in a chat interface of the text-based chat communication.

10. The system of claim 9, wherein the instructions further cause the processor to transmit a plurality of prompts for retrieving additional performance metric data from the plurality of performance metrics.

11. The system of claim 9, wherein the instructions further cause the processor to:
monitor the first performance metric data; and
detect the first performance metric is outside the predetermined range of values for triggering the alert.

12. The system of claim 9, wherein the instructions further cause the processor to detect an input from the first electronic device requesting display of the performance metric.

13. The system of claim 9, wherein the instructions further cause the processor to display the alert during the text-based chat communication in response to the first performance metric having a value above a predetermined threshold value.

14. The system of claim 9, wherein the instructions further cause the processor to display the alert during the text-based chat communication in response to the first performance metric having a value below a predetermined threshold value.

15. The system of claim 9, wherein the instructions further cause the processor to monitor input from an agent device during the text-based chat communication.

16. The system of claim 15, wherein the instructions further cause the processor to, in response to detecting the input is indicative of a request to data corresponding to a second performance metric, display the second performance metric data in the chat interface of the text-based chat communication.

17. A system for managing a contact center system, the system comprising:
means for retrieving performance metric data for a plurality of performance metrics of the contact center system;
means for retrieving alert subscription data corresponding to a first agent regarding the plurality of performance metrics;
means for initiating a text-based chat communication with a first electronic device operated by the first agent;
means for displaying an alert during the text-based chat communication according the alert subscription data, the alert being indicative that a first performance metric from among the plurality of performance metrics is outside a predetermined range of values; and
means for displaying the first performance metric in a chat interface of the text-based chat communication.

18. The system of claim 17, further comprising means for transmitting a plurality of prompts for retrieving additional performance metric data from the plurality of performance metrics.

19. The system of claim 17, further comprising:
means for monitoring the first performance metric data; and
means for detecting the first performance metric is outside the predetermined range of values for triggering the alert.

20. The system of claim 17, further comprising means for displaying the alert during the text-based chat communication in response to the first performance metric having a value above a predetermined threshold value.

* * * * *